United States Patent
Satou et al.

(10) Patent No.: US 7,081,688 B2
(45) Date of Patent: Jul. 25, 2006

(54) ENERGY RECOVERY APPARATUS AND METHOD OF OPERATING ENERGY RECOVERING APPARATUS

(75) Inventors: Kouichi Satou, Tokyo (JP); Seiji Yanagisawa, Tokyo (JP); Yuji Tanaka, Tokyo (JP); Shinichi Takahashi, Tokyo (JP); Yukihiro Fujita, Tokyo (JP); Osamu Matsumoto, Tokyo (JP); Toshihiko Yamamoto, Tokyo (JP); Masahiro Sano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/334,576

(22) Filed: Jan. 17, 2006

(65) Prior Publication Data

US 2006/0113797 A1  Jun. 1, 2006

Related U.S. Application Data

(63) Continuation of application No. 10/383,905, filed on Mar. 7, 2003.

(30) Foreign Application Priority Data

Mar. 27, 2002  (JP)  .............................. 2002-087384
Mar. 27, 2002  (JP)  .............................. 2002-087395
Jan. 24, 2003  (JP)  .............................. 2003-015524

(51) Int. Cl.
F24D 11/02  (2006.01)

(52) U.S. Cl. ......................................................... 290/2
(58) Field of Classification Search ..................... None
See application file for complete search history.

(56) References Cited

U.S. PATENT DOCUMENTS

| 4,142,367 A | * | 3/1979 | Guisti | .......................... | 60/325 |
| 4,408,127 A | * | 10/1983 | Santos, Sr. | ................... | 290/54 |
| 4,479,352 A | * | 10/1984 | Yamaoka et al. | ............. | 60/659 |
| 4,918,369 A | * | 4/1990 | Solorow | ...................... | 322/35 |
| 6,698,223 B1 | * | 3/2004 | Satoh et al. | ............... | 62/238.7 |
| 2005/0184167 A1 | * | 8/2005 | Bach et al. | ................ | 237/12.1 |

FOREIGN PATENT DOCUMENTS

DE  4428095 A1  *  2/1996

* cited by examiner

*Primary Examiner*—Joseph Waks
(74) *Attorney, Agent, or Firm*—Towsend and Townsend, and Crew LLP

(57) ABSTRACT

A system is provided to recover unutilized energy as electric power in hydraulic turbine power generation. The system includes a heat storage tank, a pump for pumping water from the heat storage tank and to air conditioning loads, a first water feed pipe connected between an outlet of the storage pump and the air conditioning loads, and a second water feed pipe for returning the water discharged from the air-conditioning loads. A hydraulic turbine driven generator is provided on a lower portion of the second water feed pipe at such a position as to recover the potential energy of the water discharged from the air conditioning loads.

4 Claims, 17 Drawing Sheets

<OPERATION>

1. OPEN INLET VALVE OF HYDRAULIC TURBINE, CLOSE OUTLET VALVE, AND CLOSE TURBINE-BYPASSING VALVE
2. POWER SECONDARY COLD, WARM-WATER PUMP-DRIVING MOTOR
3. SEND SECONDARY COLD, WARM-WATER OPERATION DEMAND SIGNAL FROM AIR-CONDITIONING LOAD GROUP
4. RECEIVE OPERATION DEMAND SIGNAL, OPERATE SECONDARY COLD, WARM-WATER PUMP-DRIVING MOTOR, AND SEND OPERATION ANSWER SIGNAL TO GENERATOR
5. INPASSING OF PREDETERMINED TIME AFTER RECEIVNIG OPERATION ANSWER SIGNAL, OPEN INLET AND OUTLET VALVES OF TURBINE, OPERATE TURBINE, AND OPERATE GENERATOR
6. SUPPLY GENERATED POWER TO EACH LOAD

<STOP>

7. CLOSE OUTLET VALVE OF TURBINE, STOP TURBINE, AND STOP GENERATOR
8. STOP SUPPLY OF GENERATED POWER, AND STOP SUPPLY OF POWER TO EACH LOAD
9. SEND SECONDARY COLD, WARM-WATER PUMP-DRIVING MOTOR STOP DEMAND SIGNAL FROM GENERATOR, STOP SECONDARY COLD, WARM-WATER PUMP, AND SEND STOP ANSWER SIGNAL TO GENERATOR

FIG. 10

\<OPERATION\>

1. CLOSE HYDRAULIC TURBINE-BYPASSING VALVE
2. POWER SECONDARY COLD, WARM-WATER PUMP-DRIVING MOTOR
3. SEND SECONDARY COLD, WARM-WATERPUMP OPERATION DEMAND SIGNAL FROM GENERATOR
4. OPERATE SECONDARY COLD, WARM-WATERPUMP IN PASSING OF PREDETERMINED TIME AFTER RECEIVING OPERATION ANSWER SIGNAL
5. WHEN INLET PRESSURE OF TURBINE REACHES PREDETERMINED VALVE, OPEN AUTOMATIC INLET AND OUTLET VALVES OF TURBINE
6. SUPPLY GENERATED POWER TO EACH LOAD

\<STOP\>

7. CLOSE INLET AND OUTLET VALVE OF TURBINE, STOP TURBINE, AND STOP GENERATOR
8. STOP SUPPLY OF GENERATED POWER, AND STOP SUPPLY OF POWER TO SECONDARY COLD, WARM-WATER PUMP-DRIVING MOTOR
9. SEND STOP DEMAND SIGNAL FROM GENERATOR TO SECONDARY COLD, WARM-WATER PUMP
10. RECEIVE SECONDARY COLD, WARM-WATER PUMP-DRIVING MOTOR STOP DEMAND SIGNAL, AND SECONDARY COLD, WARM-WATER PUMP STOP ANSER SIGNAL TO GENERATOR

FLOW RATE  L3/L1=20~30%

ENERGY RECOVERY APPARATUS AND METHOD OF OPERATING ENERGY RECOVERING APPARATUS

BACKGROUND OF THE INVENTION

1. Field of the Invention

This invention relates to the technique of recovering unutilized energy of water used, for example, in an air-conditioning load in a building, by a hydraulic turbine power generation or the like.

2. Related Art

As an air-conditioning system in a building, there has been extensively used a regenerative heat air-conditioning system in which a heat source machine is operated, utilizing inexpensive midnight power, and the produced heat is stored in a heat storage tank, and in the daytime when an air-conditioning load develops, the stored heat is pumped out, and is fed to an air-conditioner (load), thereby effecting the air-conditioning.

FIG. 16 is a schematic diagram of an open-loop regenerative heat air-conditioning system given as a reference example.

Referring to the construction of a primary system of the regenerative heat air-conditioning system of FIG. 16, reference numeral 16 denotes a water lift pump for pumping water from a heat storage tank 16 and for feeding the water to a heat source machine 4 via a water feed pipe 17, reference numeral 2 an electric motor for driving the water lift pump 1, reference numeral 17 the water feed pipe connecting the water lift pump 1 to the heat source machine 4, reference numeral 3 a commercial power source, reference numeral 5 a two-way valve for adjusting the amount of heat produced by the heat source machine 4, reference numeral 18 a water feed pipe for returning the water, discharged from the heat source machine 4, to the heat storage tank 16, and reference numeral 6 an expansion tank provided on the water feed pipe 18. Reference numeral 29 denotes a float valve, reference numeral 25 a gate valve, and reference numeral 27 a check valve.

Referring to a secondary system of the regenerative heat air-conditioning system of FIG. 16, reference numeral 7 denotes a water lift pump for pumping water (heat) from the heat storage tank 16 and for feeding the water to a group of air-conditioning loads 10 (for example, a plurality of air-conditioning apparatuses such as an air handling unit 10a and a fan coil 10b) via a water feed pipe 19, and reference numeral 8 a double-shaft electric motor which is directly connected at its one end to the water lift pump 7 through a coupling 14 to drive this water lift pump. The other end thereof is connected to a hydraulic turbine 9 via a clutch 13. The hydraulic turbine 9 is located at such a position as to recover the potential energy of water discharged from the group of air-conditioning apparatuses 10. Reference numeral 15 denotes a commercial power source (which may be the commercial source 3). Reference numeral 11 denotes a two-way valve for adjusting the load amount of the group of air-conditioning loads 10, reference numeral 20 a water feed pipe for returning the pumping water, used in the group of air-conditioning apparatuses 10, to the heat storage tank 16, and reference numeral 12 an expansion tank which is provided on the water feed pipe 20, and serves to destroy a siphoning effect so as to exert a head of the fed water (the potential energy of the fed water) on the hydraulic turbine. In some cases, instead of the expansion tank 12, a vacuum breaker is used. Reference numeral 24 denotes a water feed pipe for returning the water, discharged from the hydraulic turbine 9, to the heat storage tank 16. Reference numeral 22 denotes a water feed pipe bypassing the hydraulic turbine 9. Gate valves 21 to 23 are provided on these water feed pipes. Namely, the pumping water, fed to the group of air-conditioning apparatuses 10 by the water lift pump 7, and is used there, and then is fed to the hydraulic turbine 9. The hydraulic turbine 9 is operated by the potential energy of the pumping water to produce power, and transmits this power to the double-shaft electric motor 8. A load of the double-shaft electric motor 8 is made smaller than a load of the water lift pump 7 by this amount. Then, the pumping water, discharged from the hydraulic turbine 9, returns to the heat storage tank 16. Reference numeral 26 denotes a gate valve, reference numeral 28 a check valve, and reference numeral 30 a float valve.

FIG. 17 is a diagram showing operation characteristics of the pump and hydraulic turbine of the reference example. H(m) at an upper portion of an ordinate axis of the diagram represents a total pump head in the case of the pump, and represents an effective head in the case of the hydraulic turbine. P(kw) at a lower portion of the ordinate axis of the diagram represents power for both. An abscissa axis of the diagram represents the water quantity Q. A curve A represents a Q-H performance curve of the pump, and a curve C represents a shaft power curve obtained when the hydraulic turbine is not operated. In the water feed system of FIG. 16, the total pump head $H_0$ is required for feeding the amount $Q_0$ of water by operating only the storage pump 7, and an operating point at this time is a point $O_4$ on the curve A. Power, consumed at this time, is L1 representing the pump shaft power, and an operating point is O1 on the curve C. A curve B represents the effective head (the pressure head difference between the inlet and outlet sides of the hydraulic turbine) of the hydraulic turbine 9, and it means that when the amount $Q_0$ of water is flowed, a pressure difference head (effective head) $H_1$ develops between the inlet and outlet sides of the hydraulic turbine 9, and the hydraulic turbine absorbs this potential energy to produce power L3 described below.

A curve D is a power curve obtained when the storage pump 7 and the hydraulic turbine 9 are operated. Power, produced by the hydraulic turbine 9 when the amount $Q_0$ of water flows, is L3. In this case, the power recovery (L3/L1) is about 20% to about 30%. The operating point at this time is $O_2$ on the curve D, and the consumed power is reduced by L3 relative to L1, and becomes L2 representing the pump shaft power. Energy, corresponding to this power L2, is supplied as electric power from the commercial power source 15.

In the case where a large amount of water flows into the hydraulic turbine, the plurality of apparatuses, described above, are operated in a parallel manner.

There has been proposed another reference example in which a similar system for recovering potential energy of pumping water, passed past a heat source machine, is provided also in a primary system of a regenerative heat air-conditioning system, and this system has been efficiently utilized. Namely, in FIG. 16, the electric motor 2 for driving the water lift pump 1 is modified into the double-shaft type, and the hydraulic turbine 9 is connected to that side of the electric motor 2, which is not connected to the pump, and water, discharged from the heat source machine 4, is received by the hydraulic turbine, and the hydraulic turbine is operated by this pressure head, and a torque, produced by the hydraulic turbine, is transmitted to the electric motor 2, thereby reducing the load (the storage pump 1 in this case) of the electric motor 2. Such conventional examples are disclosed, for example, in JP-A-50-128801 (power recovery pump apparatus) and JP-A-50-49701 (power recovery pump apparatus). A reference example of a hydraulic turbine power-generating system for generating electric power by a hydraulic turbine, provided in a water channel such as a dam and a paddy field, is disclosed in JP-A-5-10245 (outer ring-driving-type hydraulic turbine power-generating apparatus).

In the above reference techniques, however, the clutch is used for connecting the electric motor and the hydraulic turbine together, and a problem to be solved is to improve its transmission efficiency. And besides, there has been encountered another problem that the energy, recovered by the hydraulic turbine, is mechanical power, and therefore can not be used in other loads in a building because of the structure.

SUMMARY OF THE INVENTION

It is therefore an object of this invention to recover unutilized energy as electric power by the hydraulic turbine power generation so as to reuse it.

It is not rational that such apparatuses are designed and produced individually in accordance with a height of a building (a pressure head of a hydraulic turbine) and an air-conditioning load (flow rate) in the building. Generally, a plurality of general-purpose apparatuses are beforehand prepared, and a required number of (plurality of) apparatuses are operated in a parallel manner in accordance with the building specification or the load facility specification.

Another object of the invention is to provide a method of serial operation and parallel operation of a plurality of hydraulic turbine power-generating apparatuses, in which a plurality of general-purpose hydraulic power-generating apparatuses are installed serially or in parallel in accordance with the specification of a facility (hydraulic turbine specification) such as a building, a dam and a river, and are operated at low costs, and also to provide a control apparatus for such method.

According to the present invention, there is provided an energy recovery apparatus comprising a heat storage tank provided at a lower portion of a building; a secondary system-side water lift pump for pumping water from the heat storage tank and for feeding it to a group of air-conditioning loads; a first water feed pipe provided between an outlet port of the storage pump and the air-conditioning load group; a second water feed pipe for returning the water, discharged from an outlet port of the air-conditioning load group, to the heat storage tank; an expansion tank or a vacuum breaker provided at an uppermost portion of the second water feed pipe; a hydraulic turbine, which is provided on a lower portion of the second water feed pipe, and is located at such a position as to recover the potential energy of the water discharged from the air-conditioning load group; a generator driven to be rotated by a torque of the hydraulic turbine to produce electric power; an inverter connected to an output terminal of the generator so as to produce DC power; and a system connecting device which receives the DC power from the inverter, and converts it into AC power, and supplies it to an electric motor for driving the secondary system-side storage pump.

The apparatus of the present invention has the above construction, and is operated as follows.

1) Before the operation, inlet and outlet valves of the hydraulic turbine and a hydraulic turbine-bypassing valve are closed. First, the secondary system-side storage pump is powered.

2) Next, an operation demand signal is fed from the air-conditioning load group to the storage pump.

3) Upon reception of the operation demand signal from the air-conditioning load group, the storage pump is operated, and at the same time it feeds an operation answer signal to the generator.

4) The inlet and outlet valves of the hydraulic turbine are opened a predetermined time after the operation answer signal is received. As a result, the hydraulic turbine and the inverter are operated. The rotational speed of the hydraulic turbine gradually increases, so that the generator begins to operation.

5) The generated electric power is supplied to the load (for example, the storage pump-driving electric motor and so on) via the inverter.

6) The inverter inputs the electric power, generated by the generator, thereinto, and converts it into AC power, and feed it to the system connecting device (regenerating converter). The system connecting device (regenerating converter) converts the DC power, inputted thereinto, into AC power, and feeds it back to the power source.

7) The expansion valve or the vacuum breaker is provided at the upper portion of the water feed pipe, and has a portion open to the atmosphere, or has an equivalent function, and prevents the expansion of the water, and discharges the air within the pipe or introduces the ambient air to break the vacuum so as to assist the fed water in falling to the hydraulic turbine. In another embodiment, a pressure sensor, provided in the vicinity of the hydraulic turbine, detects a pressure of this portion, and when this water pressure exceeds a predetermined value, the automatic valves, provided in the vicinity of the hydraulic turbine, are opened.

At the time of stopping the operation:

8) The inlet and outlet valves of the hydraulic turbine are closed, and the hydraulic turbine is stopped, and the inverter is stopped, and the system connecting device is stopped.

9) The supply of the generated power is stopped, and the supply of the power to the load, such as the secondary system-side storage pump-driving electric motor, is stopped.

10) A stop demand signal is fed from the generator to the secondary system-side storage pump.

11) The stop demand signal is received, and the secondary system-side storage pump-driving electric motor is stopped, and a stop answer signal is fed to the generator.

In the power system of the energy recovery apparatus having a plurality of loads, an inverter is provided at the output of the generator for recovering the unutilized energy, and a system connecting device is provided between the inverter and the power source so as to feed the generated power of the generator back to the power source so that the plurality of loads can use the generated power of the generator. Alternatively, a control apparatus for effecting such operation control is provided.

In the power system of the energy recovery apparatus having a plurality of loads, a plurality of inverters are provided at the outputs of the generators for recovering the unutilized energy, and a common system connecting device is provided between the plurality of inverters and the power source so as to feed the generated power of the generators back to the power source so that the plurality of loads can use the generated power of the generators. Alternatively, a control apparatus for effecting such operation control is provided.

According to another aspect of the invention, there is provided the following construction.

This energy recovery apparatus comprises a heat storage tank provided at a lower portion of a building; a secondary system-side storage pump for pumping water from the heat storage tank and for feeding it to a group of air-conditioning loads; a first water feed pipe provided between an outlet port of the storage pump and the air-conditioning load group; a second water feed pipe for returning the water, discharged from an outlet port of the air-conditioning load group, to the heat storage tank; an expansion tank or a vacuum breaker provided at an uppermost portion of the second water feed pipe; a hydraulic turbine generator, which is provided on a lower portion of the second water feed pipe, and is located at such a position as to recover the potential energy of the water discharged from the air-conditioning load group; an inverter connected to an output terminal of the hydraulic turbine generator so as to produce DC power; and a system connecting device which receives the DC power from the inverter, and coverts it into AC power, and supplies it to an electric motor for driving the secondary system-side storage pump, and a plurality of hydraulic turbine generators are provided, and are installed serially or in parallel, and this energy recovery apparatus is operated.

In this construction, when the plurality of hydraulic turbine generators are installed serially or in parallel, the installation is effected in the following.

A water quantity of a facility is Q, and a head thereof is H, and a water quantity of the hydraulic turbine power-generating apparatus is $Q_0$, and an effective head thereof is $H_0$, and the facility head H is divided by the effective head $H_0$ of the hydraulic turbine power-generating apparatus, thereby finding the quotient n, and if the remainder develops at this time, and the generation of electric power is possible with a head, corresponding to this remainder, n is defined as (n+1), and if the power generation is impossible, n is defined as n, so that the hydraulic turbine power-generating apparatuses whose number is n are installed serially.

Alternatively, a water quantity of a facility is Q, and a head thereof is H, and a water quantity of the hydraulic turbine power-generating apparatus is $Q_0$, and an effective head thereof is $H_0$, and the facility water quantity Q is divided by the water quantity $Q_0$ of the hydraulic turbine power-generating apparatus, thereby finding the quotient n, and if the remainder develops at this time, and the generation of electric power is possible with a water quantity, corresponding to this remainder, n is defined as (n+1), and if the power generation is impossible, n is defined as n, so that the hydraulic turbine power-generating apparatuses whose number is n are installed in parallel.

The energy recovery apparatus of the invention has this construction, and is operated as follows.

1) When the plurality of hydraulic turbine generators, connected serially or in parallel, are operated, these generators produce electric power in accordance with the points of use of them.

2) Each of the generator-side inverters converts the generated power of the generator into DC power, and feed back or supply the DC power to the system connecting device via a cable.

3) The system connecting device converts the DC power, fed back or supplied from each inverter, into AC power acceptable by the power source, and feeds it back to the power source.

For controlling the plurality of hydraulic turbine power-generating apparatuses, the inverters are provided for the plurality of hydraulic turbine power-generating apparatuses, respectively, and the system connecting device is provided at the power source-sides of the inverters, and a DC voltage terminal P of each inverter is connected to a DC voltage terminal P of the system connecting device while a DC voltage terminal N of each inverter is connected to a DC voltage terminal P of the system connecting device, and the control is effected so that the generated power can be fed back to the power source. Alternatively, a control apparatus for effecting such control is provided.

Alternatively, the plurality of hydraulic turbine power-generating apparatuses are located respectively at such positions as to recover the potential energy of the water discharged from the air-conditioning load group, and the plurality of inverters are provided for the plurality of hydraulic turbine power-generating apparatuses, respectively, and the system connecting device is provided at the power source-sides of the inverters, and a DC voltage terminal P of each inverter is connected to a DC voltage terminal P of the system connecting device while a DC voltage terminal N of each inverter is connected to a DC voltage terminal P of the system connecting device, and the control apparatus is so constructed that the generated power can be fed back to the power source.

The control apparatus has such a construction that the plurality of inverters and the system connecting device are contained in a common control panel.

Other objects, features and advantages of the invention will become apparent from the following description of the embodiments of the invention taken in conjunction with the accompanying drawings.

BRIEF DESCRIPTION OF THE DRAWINGS

FIG. 9 is a flow chart showing the operation procedure and control procedure for a sixth embodiment of the invention.

FIG. 10 is a flow chart showing the operation procedure and control procedure for a seventh embodiment of the invention.

DESCRIPTION OF THE PREFERRED EMBODIMENTS

A preferred embodiment of the present invention will now be described first with reference to FIGS. 1 to 10.

Figure 1:
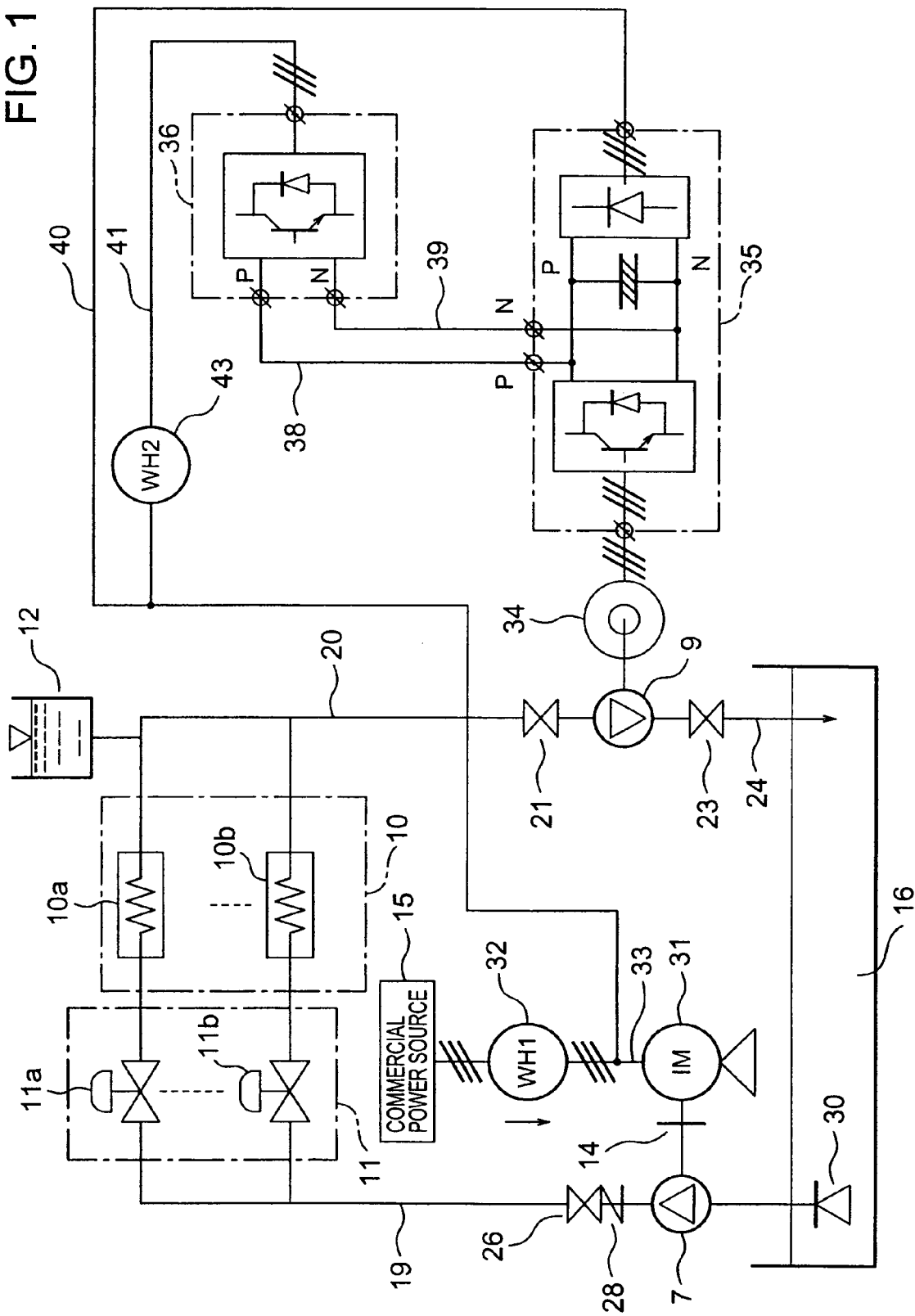
FIG. 1 is a view showing a first embodiment of the present invention.

FIG. 1 is a diagram of a first embodiment of the present invention. A system of FIG. 1 differs from the secondary system of the regenerative heat air-conditioning system of FIG. 16 (showing the reference example) in that the double-shaft electric motor 8 is replaced by an ordinary electric motor 31 (non-double-shaft electric motor), so that a water lift pump 7 and a hydraulic turbine 9 are separated from each other, and a generator 34 is mounted on this hydraulic turbine 9 (which may be of the integral type containing such generator), and that an inverter 35 is connected to an output terminal of the generator 34. A system connecting device 36 (regenerating converter device) is provided, and the inverter 35 and the system connecting device 36 are connected to the electric motor 31 via cables 40 and 41, that is to say, to a point 33 between the electric motor 31 (for driving the storage pump 7) and a commercial power source 15 (which may be a commercial source 3). Further, a positive DC terminal P and a negative DC terminal N of the inverter 35 are connected respectively to a positive DC terminal P and a negative DC terminal N of the system connecting device 36 via respective cables 38 and 39. Electric power, generated by the generator 34, is converted into a direct current by the inverter 35, and is converted into an alternating current by the system connecting device 36, and is fed back to the commercial power source 15. Reference numerals 32 and 37 denote electric energy meters, respectively.

When the hydraulic turbine 9 is not operated, the electric motor 31 for driving the water lift pump in the secondary system is supplied with electric power from the commercial power source 15. When the electric power, generated by the generator 34, is not sufficient during the operation of the hydraulic turbine 9, this electric power and the electric power from the commercial power source 15 are used in combination. When the generated electric power is in surplus, the surplus electric power is fed back to the commercial power source 15 via the terminals P and N of the inverter 35 and further via the system connecting device 36.

Figure 16:
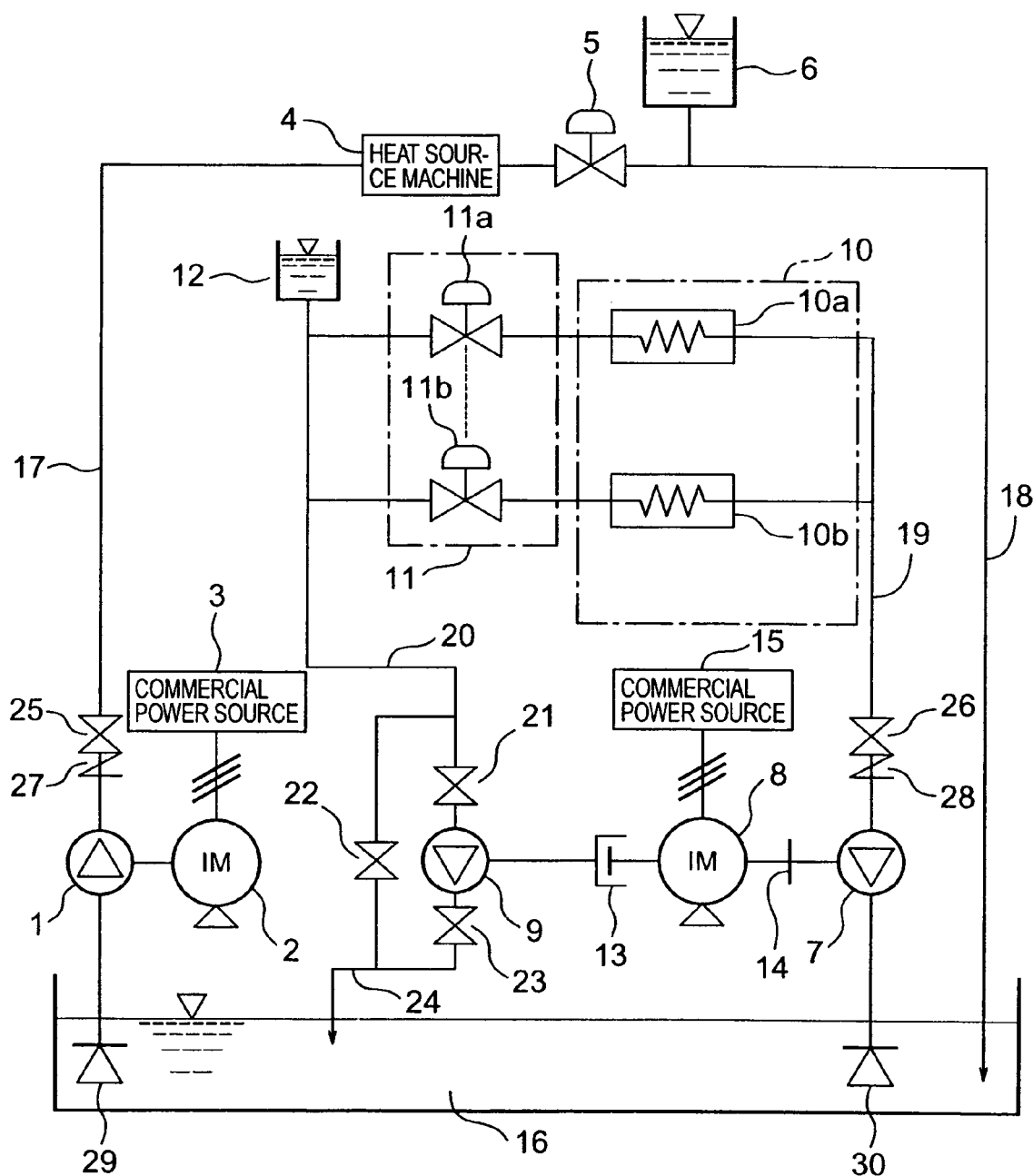
FIG. 16 is a view showing a regenerative heat air-conditioning system given as a reference example.

Identical reference numerals to those of FIG. 16 denote identical equipments or devices, and therefore explanation thereof will be omitted. FIG. 1 shows the secondary system, and the showing of a primary system is omitted.

Figure 2:
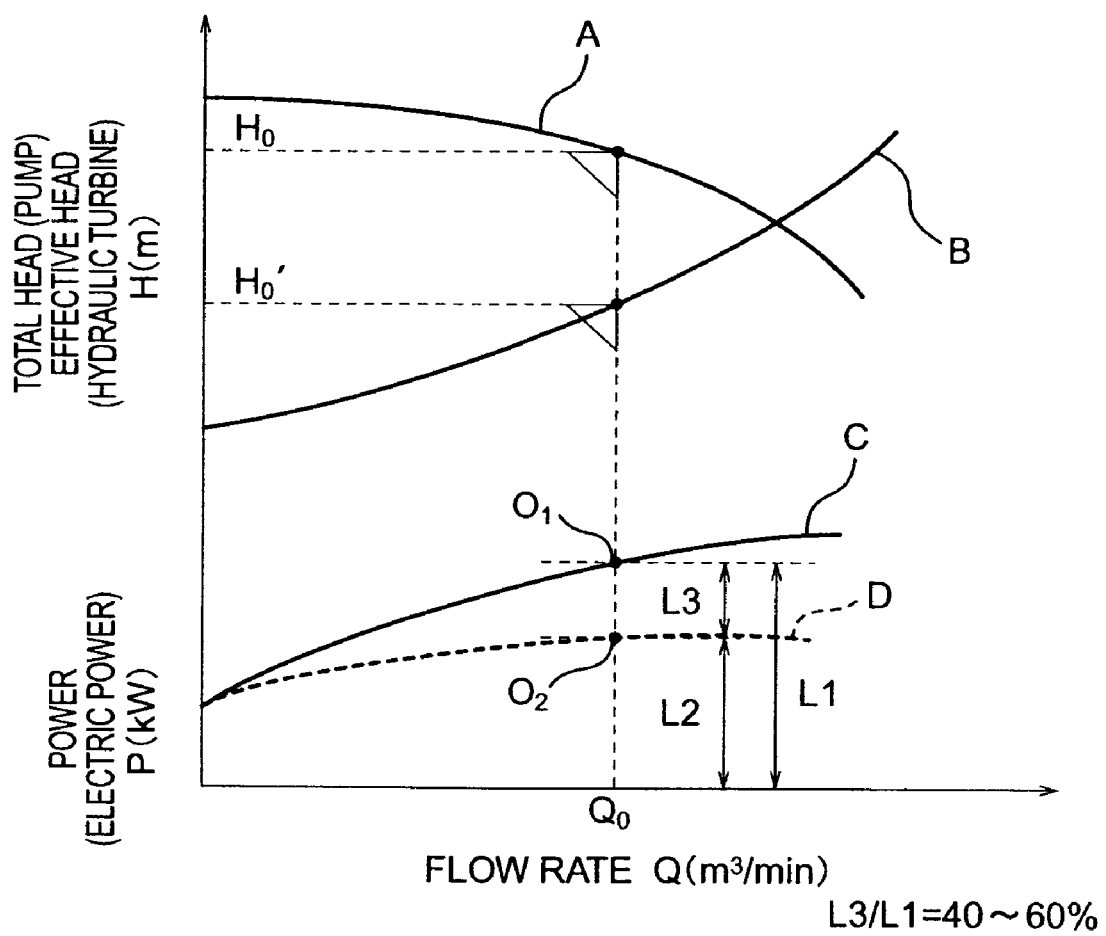
FIG. 2 is a diagram showing operation characteristics of a pump and hydraulic turbine according to the first embodiment.
Figure 17:
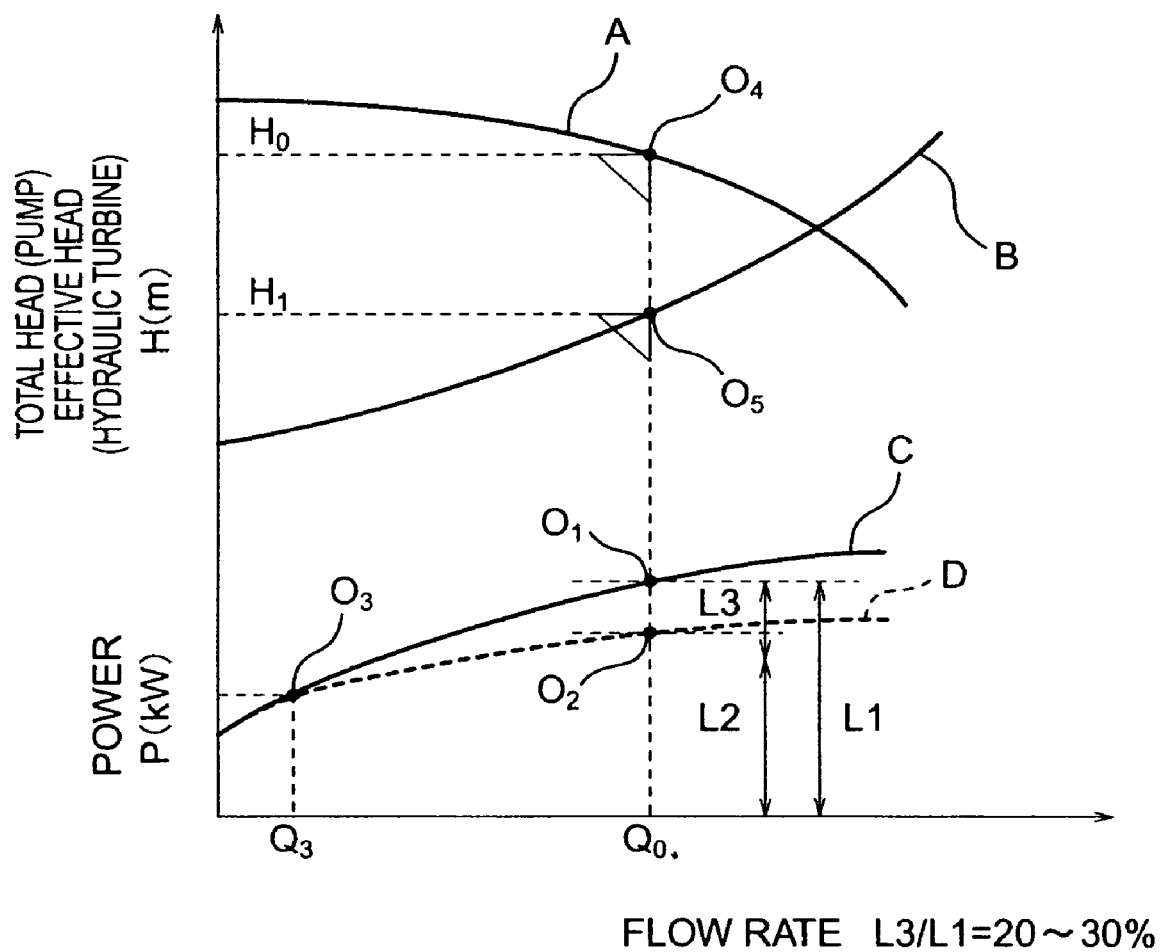
FIG. 17 is a diagram showing operation characteristics of a pump and hydraulic turbine of the regenerative air-conditioning system of the reference example.

FIG. 2 is a diagram showing operation characteristics of the pump and hydraulic turbine of the first embodiment of the invention. Identical reference characters to those of FIG. 17 have identical meanings, and therefore explanation thereof is omitted. In the first embodiment of the invention, when a shaft power L1, required for flowing the amount $Q_0$ of water by the storage pump 7, is to be obtained, generated power L3, regenerated via the hydraulic turbine 9, the generator 34, the inverter 35 and the system connecting device 36, and electric power L2 from the commercial power source are used to provide this shaft power L1. Naturally, when a two-way valve 11 is throttled, so that the load of the storage pump 7 is reduced, the driving power of the electric motor 31, becomes, in some cases, smaller than the power produced by the hydraulic turbine 9. In this case, power is fed back to the commercial power source 15 via a path (the hydraulic turbine 9-the generator 34-the inverter 35-the system connecting device 36-the commercial power source 15). In this embodiment, the power recovery (L3/L1) is about 40% to about 60%, and is higher than the energy recovery of the conventional system.

Figure 3:
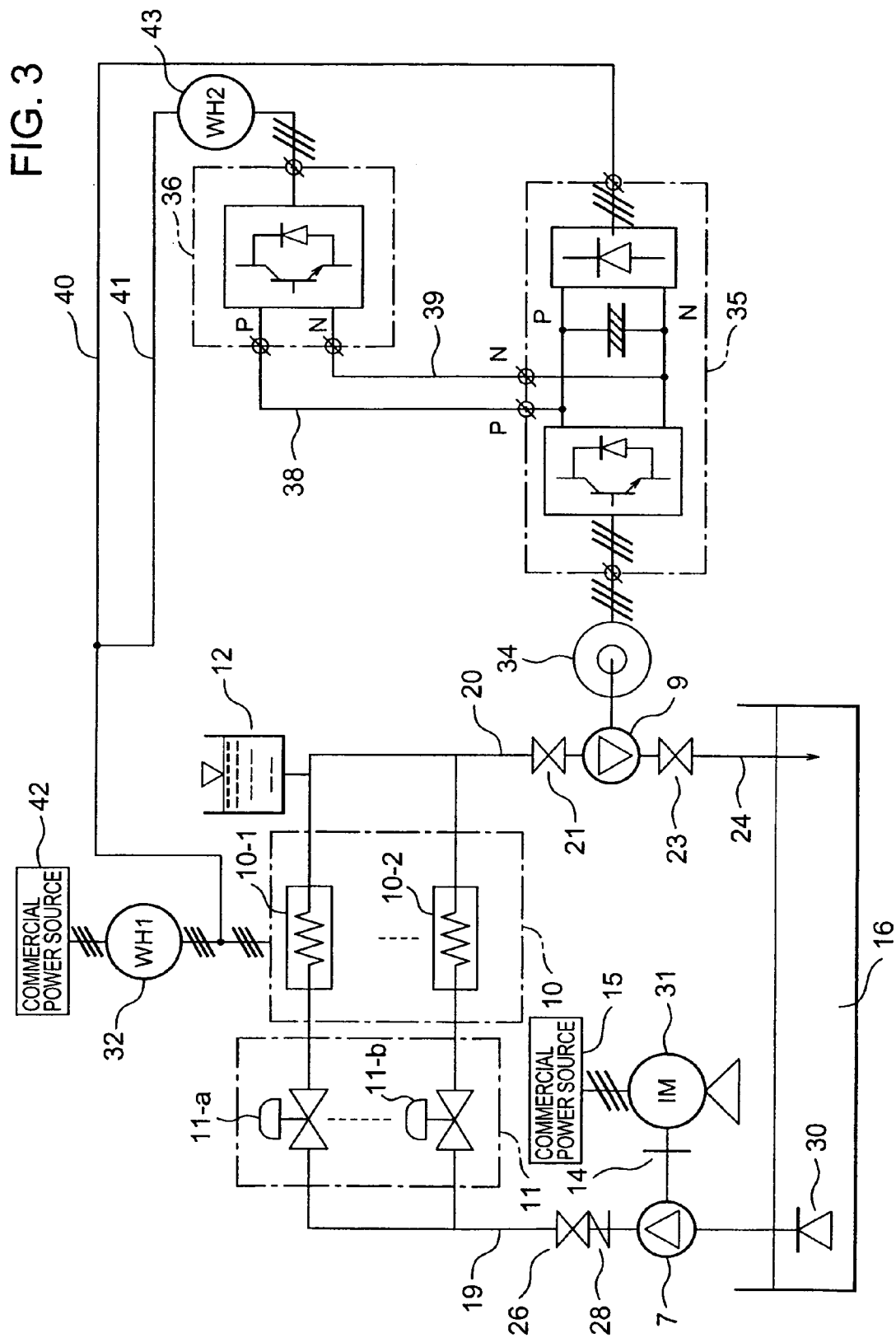
FIG. 3 is a view showing a second embodiment of the invention.

A second embodiment of the invention will be described with reference to FIG. 3. Identical reference numerals to those of FIGS. 1 and 16 have identical meanings, and therefore explanation thereof is omitted. In FIG. 3, only a secondary system is shown, and the showing of a primary system is omitted. This embodiment differs from the first embodiment in that regenerated power from a generator is applied not to a storage pump-driving electric motor 31 but to a group of air-conditioning apparatuses 10. As shown in FIG. 3, an inverter 35 and a system connecting device 36 (regenerating converter device) are connected between the group of air-conditioning apparatuses 10 and a commercial power source 42 (which may be a commercial source 3, 15) via cables 40 and 41. Further, DC terminals P and N of the inverter are connected respectively to DC terminals P and N of the system connecting device via respective cables 38 and 39.

When a hydraulic turbine 9 is not operated, power is supplied from the commercial power source 42 to the group of air-conditioning apparatuses 10. During the operation of the hydraulic turbine 9, when electric power, generated by the generator 34, is insufficient, depending on a load condition of the air-conditioning apparatus group 10, this electric power and the electric power from the commercial power source 42 are used in combination. When the electric power, generated by the generator 34, is in surplus, the surplus electric power is fed back to the commercial power source 42 via the terminals P and N of the inverter 35 and further via the system connecting device 36. Reference numeral 43 denotes an electric energy meter.

Figure 4:
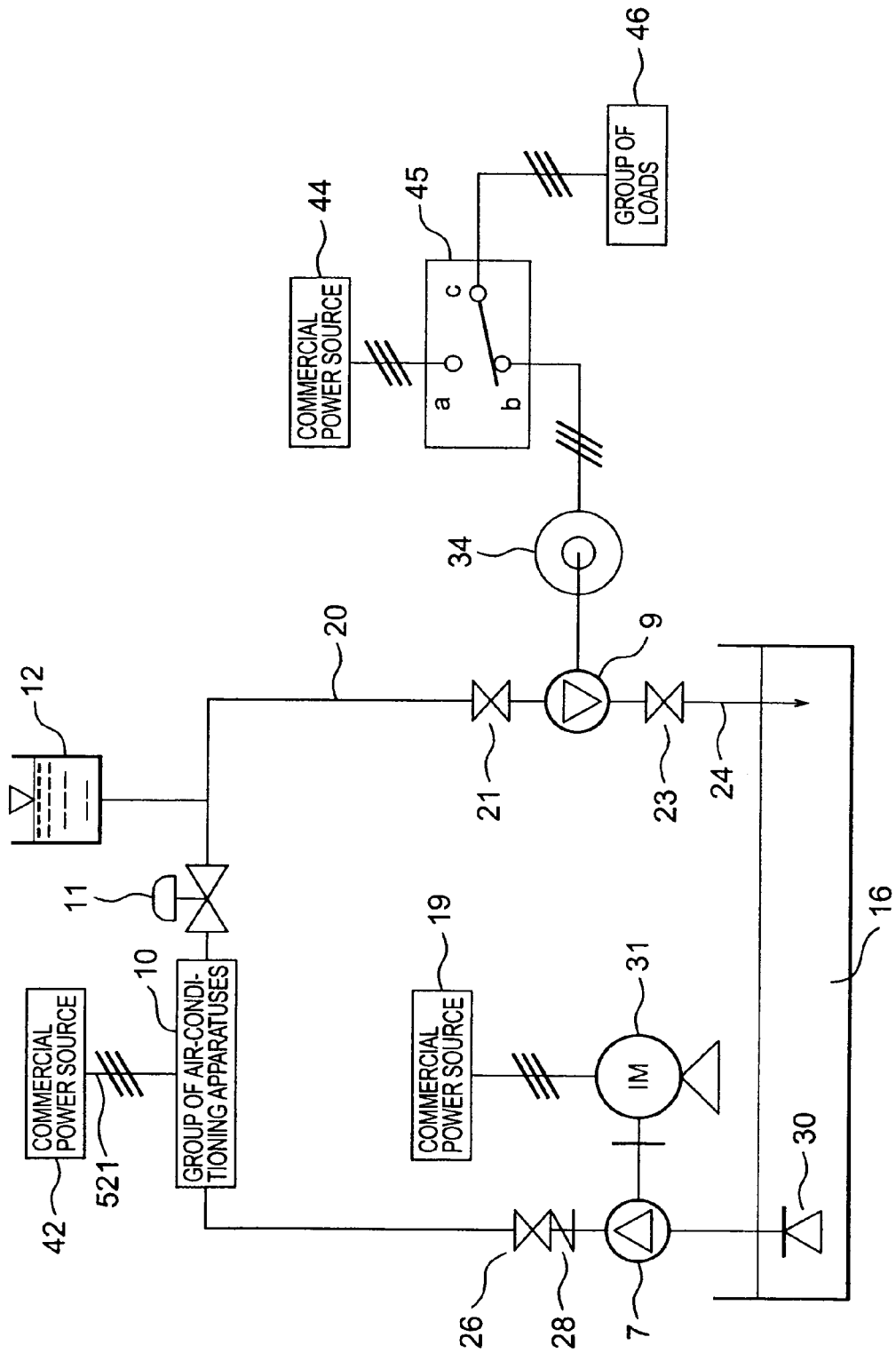
FIG. 4 is a view showing a third embodiment of the invention.

A third embodiment of the invention will be described with reference to FIG. 4. Identical reference numerals to those of FIGS. 1, 3 and 16 have identical meanings, and therefore explanation thereof is omitted. In FIG. 4, only a secondary system is shown, and the showing of a primary system is omitted. In this embodiment, electric power, generated by a hydraulic turbine 9, is supplied to a group of loads such as illumination equipments in a building. In FIG. 4, reference numeral 46 denotes the group of loads such as illumination equipments in the building. Reference numeral 45 denotes power system switching means. When this power system switching means 45 is switched into such a condition that its contacts c and a are connected together, the load group 46 is connected to a commercial power source 44 (which may be a commercial power source 3, 15, 42). When this switching means is switched into such a condition that its contacts c and b are connected together, the load group 46 is connected to the generator 34. Namely, during the operation of the hydraulic turbine 9, when electric power, generated by the generator 34, is sufficient for a load condition of the group of loads 46, the contacts c and b of the power system switching means 45 are connected together so as to supply the electric power of the generator to the group of loads. When the generated electric power is insufficient, the power system switching means 45 is switched so as to connect the contacts c and a together, thereby supplying electric power of the commercial power source 44 to the group of loads 46.

Figure 5:
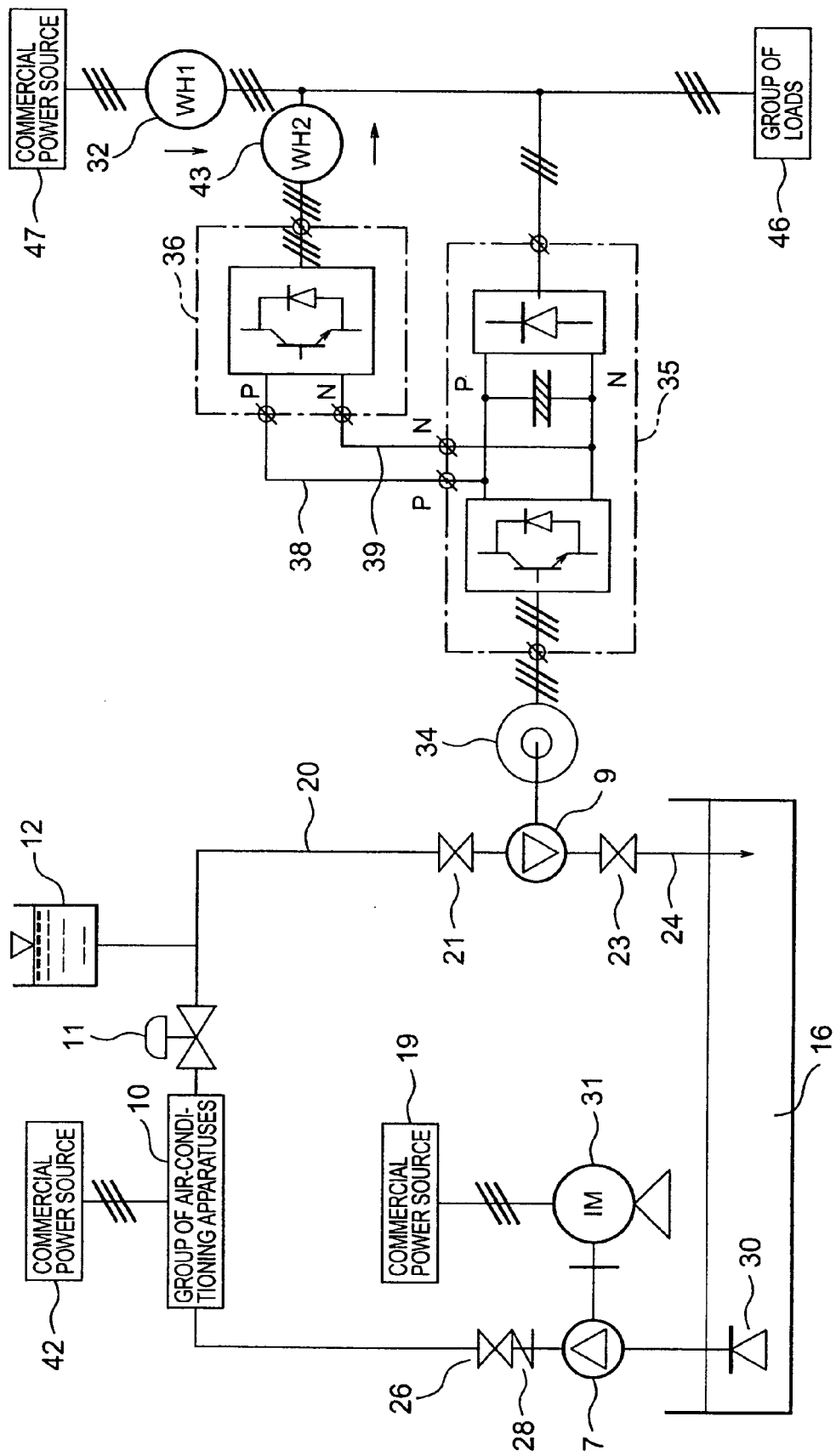
FIG. 5 is a view showing a fourth embodiment of the invention.

A fourth embodiment of the invention will be described with reference to FIG. 5. Identical reference numerals to those of FIGS. 1, 3, 4 and 16 have identical meanings, and therefore explanation thereof is omitted. In FIG. 5, only a secondary system is shown, and the showing of a primary system is omitted. This embodiment is an improvement over the third embodiment. When a load amount of a group of loads 46 is so large that electric power, generated by a generator 34, is insufficient, the electric power from the generator 34 and electric power from a commercial power source 47 (which may be a commercial source 3, 15, 42, 44) are used in combination. In FIG. 5, electric power can be applied to the group of loads 46 (as in FIG. 4) from both of the generator 34 and the commercial power source 47, and an inverter 35 is connected to the generator 34, and a system connecting device 36 (which receives DC electric power from the inverter 35, and coverts it into AC electric power, and feeds it back to the power source) is connected between the commercial power source 47 and the inverter 35. DC terminals P and N of the system connecting device 36 are connected respectively to DC terminals P and N of the inverter 35 via respective cables 38 and 39. In this construction, when electric power, generated by the generator 34, is insufficient, this electric power and the electric power from the commercial power source 47 are supplied to the group of loads.

Figure 6:
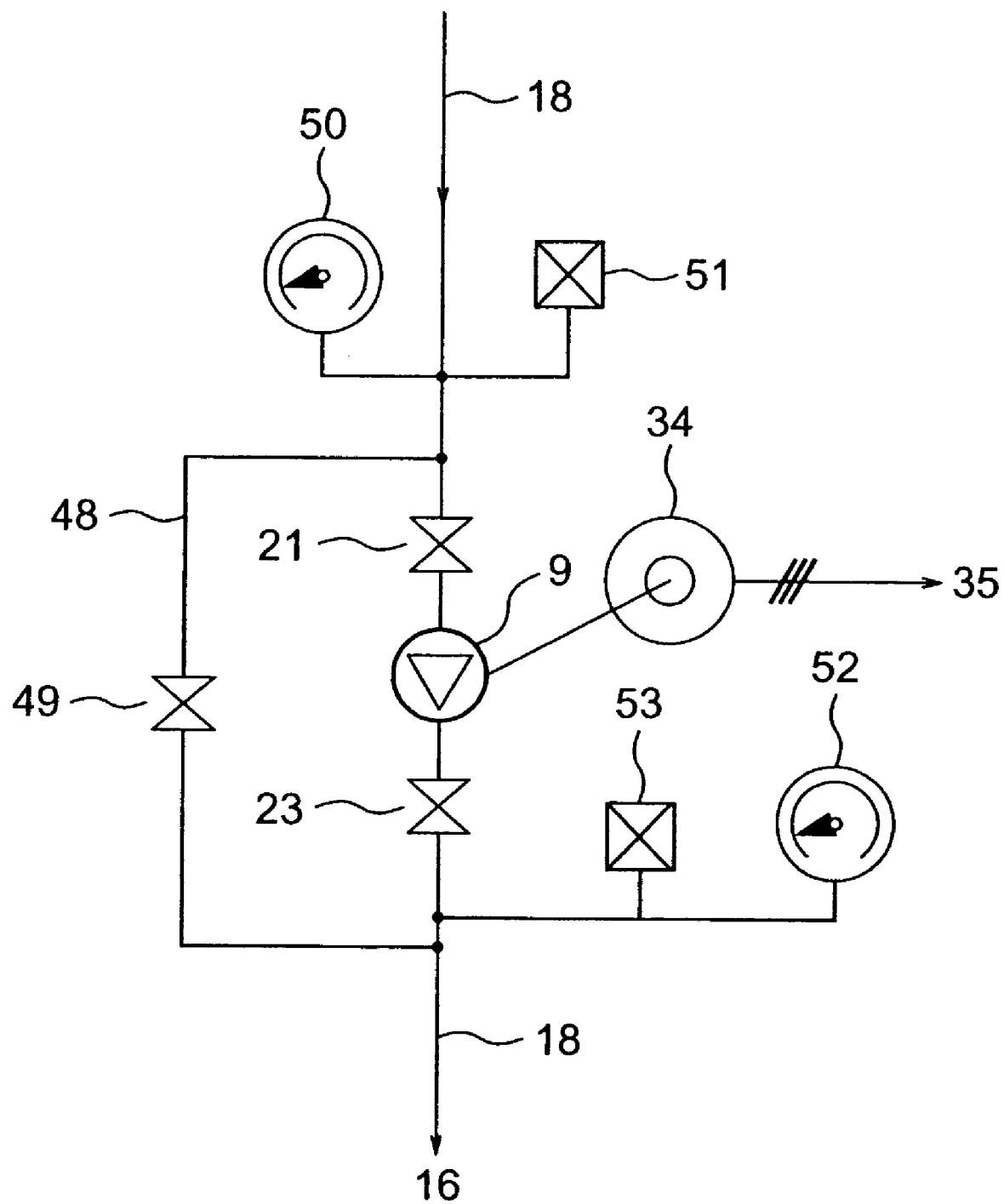
FIG. 6 is a schematic diagram of a portion of the fifth embodiment of the invention.
Figure 7:
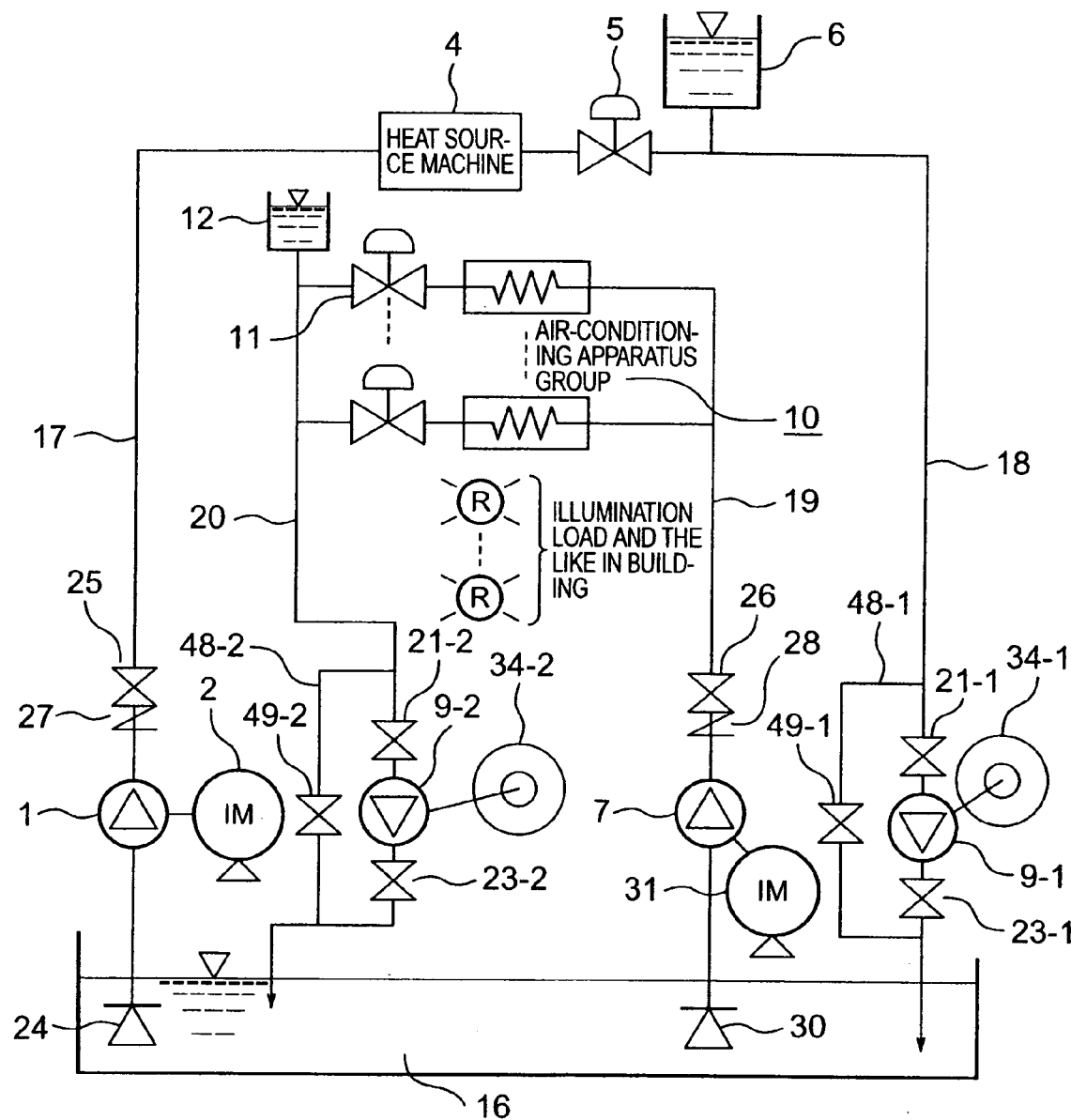
FIG. 7 is a schematic diagram showing the fifth embodiment of the invention.

A fifth embodiment of the invention will be described with reference to FIG. 6. In this embodiment, the invention is applied to a primary system of a regenerative heat air-conditioning system. A hydraulic turbine 9 is provided on an intermediate portion of a water feed pipe 18, and gate valves 21 and 23 are provided respectively at inlet and outlet sides of the hydraulic turbine 9, and a bypass pipe 48 and a gate valve 49 are provided in bypassing relation to these. A pressure gauge 50 and a pressure sensor 51 are provided at the inlet side of the hydraulic turbine 9, and a pressure gauge 52 and a pressure sensor 53 are provided at the outlet side of the hydraulic turbine 9. When the maintenance of the hydraulic turbine 9, generator 34 and their associated equipments is to be effected, the gate valves 21 and 23 are closed while the gate valve 49 is opened, so that the fed water, passed past a heat source machine 4, is returned to a heat storage tank 16 sequentially via a hydraulic turbine-upstream side portion of the water feed pipe 18, the bypass pipe 48, the gate valve 49 and a hydraulic turbine-downstream side portion of the water feed pipe 18. By doing so, the heat source machine 4 can be operated even when the maintenance of the hydraulic turbine 9, generator 34 and their associated equipments is effected. Similarly, this arrangement can be applied to a secondary system, and in this case, a group of air-conditioning apparatuses 10 can be operated even when the maintenance of a hydraulic turbine 9, generator 34 and their associated equipments is effected. FIG. 7 is a schematic view showing this arrangement. In this Figure, the showing of pressure gauges, pressure sensors, an inverter, a system connecting device and so on is omitted. Sign "–1", added to reference numerals 9, 21, 23, 34, 48 and 49, indicates that these devices and equipments are provided at the primary system, and sign "–2", added to these reference numerals, indicates that these devices and equipments are provided at the secondary system.

Figure 8:
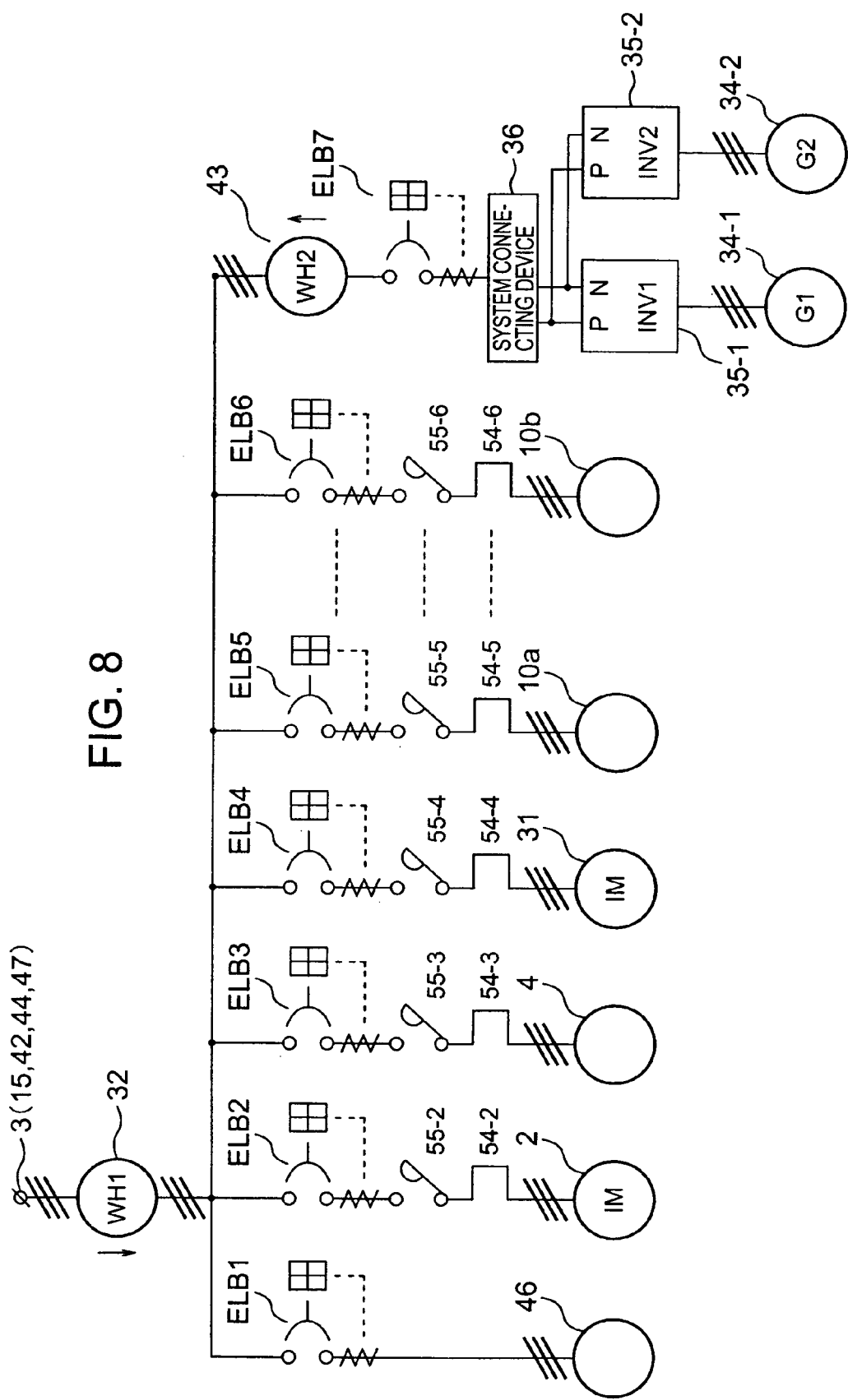
FIG. 8 is a view showing one example of connection of various equipments according to the invention.

FIG. 8 is a power system diagram showing one example of connection of various equipments. Reference characters ELB1 to ELB7 denote earth leakage breakers, and reference numerals 54-2 to 54-6 and 55-2 to 55-6 denote magnet contacts each with a thermal breaker. Reference numeral 34-1 denotes a generator of a primary system, reference numeral 34-2 a generator of a secondary system, reference numeral 35-1 an inverter of the primary system, and reference numeral 35-2 an inverter of the secondary system. In FIG. 8, the generators and inverters are provided in two pairs as described for FIG. 7, and terminals P and N of each of the inverters are connected respectively to terminals P and N of a system connecting device 36. Identical reference numerals to those of FIGS. 1 to 7 and 16 have identical meanings, and therefore explanation thereof is omitted.

A sixth embodiment of the invention will be described with reference to FIG. 9. In this embodiment, the procedure of operation of control devices for a group of air-conditioning apparatuses 10, a secondary system storage pump-driving electric motor 31, a generator 34, an inverter 35 and a load equipment (although these are not shown in the drawings), as well as a control procedure thereof, are provided, and these are operated in a coordinated manner. FIG. 9 is a flow chart showing the operation procedure and the control procedure. Namely, for operating the system, an inlet valve of a hydraulic turbine is opened, and an outlet valve thereof is closed, and a hydraulic turbine-bypass valve is closed (Step 1). In Step 2, power is supplied to the secondary system storage pump-operating electric motor 31, and in Step 3, an operation demand signal is fed from the air-conditioning apparatuses group 10 to a storage pump 7 of the secondary system. In Step 4, the storage pump 7 of the secondary system receives the operation demand signal, and the secondary system storage pump-driving electric motor 31 is operated. Thereafter, an operation answer signal is fed to the generator 34. In Step 5, a predetermined time after this operation answer signal is received by the generator, the outlet valve of the hydraulic turbine is opened, and the hydraulic turbine is operated. As a result, the generator is operated to produce electric power. In Step 6, the electric power, generated by the generator 34, is supplied to the loads. Next, for stopping the operation, the outlet valve of the hydraulic turbine is closed, and the operation of the hydraulic turbine 9 is stopped (Step 7). As a result, the generator 34 is stopped. In Step 8, the supply of the generated electric power is stopped, and the operation of the inverter 35 is stopped. Then, the supply of electric power to the loads is stopped. In Step 9, a stop demand signal is fed from the generator 34 to the storage pump 7, and the storage pump 7 is stopped. Then, a stop answer signal is fed to the generator 34. In this embodiment, although the load of the generator 34 is the secondary system storage pump-driving electric motor 34, this load may be the air-conditioning apparatus group 10 or a heat source machine 4, and may be other load such as illumination equipments in the building. By thus providing the operation procedure and the control procedure, the equipments can be satisfactorily operated in a coordinated manner without any error so that they can perform their performances and functions. Although not shown in the drawings, the operation demand signal, the operation answer signal, the stop answer signal and so on are fed between the control devices for respectively controlling the air-conditioning apparatus group, the water lift pump, the storage pump-driving electric motor, the generator and so on.

A seventh embodiment of the invention will be described with reference to FIG. 10. This embodiment is an improvement over the sixth embodiment, and in this embodiment, an automatic coordinated operation is carried out. Therefore, gate valves 21, 23 and 49 (as in FIG. 6) are formed into the automatic type. The procedure of operation of control devices for a heat source machine 4, a primary system storage pump-driving electric motor 2, a generator 34-1, an inverter 35-1 and a load equipment (although these are not shown in the drawings), as well as a control procedure thereof, are provided, and these are automatically operated in a coordinated manner. FIG. 10 is a flow chart showing the operation procedure and the control procedure. Namely, for operating the system, an inlet valve of a hydraulic turbine is opened, and an outlet valve thereof is closed, and a hydraulic turbine-bypass valve is closed (Step 1). In order that the automatic running and the automatic operation can be effected at the time of the operation of the system, Step 5, in which inlet and outlet valves of a hydraulic turbine are opened when the inlet pressure of the hydraulic turbine exceeds a predetermined pressure, is added with respect to the procedure of FIG. 9, and by doing so, the hydraulic turbine 9, the generator 34 and their associated equipments can be automatically operated. At the time of stopping the operation, the inlet and outlet valves of the hydraulic turbine are closed (Step 9), thereby automatically stopping the hydraulic turbine 9, the generator 34 and the associated equipments. The other operations are the same as in FIG. 9, and therefore explanation thereof is omitted here. By doing so, the erroneous operation is eliminated, and the control of the operation is easier.

As a further improved embodiment, conditions for the opening of the inlet and outlet valves of the hydraulic turbine are that a heat source machine is operated and that the inlet pressure of the hydraulic turbine is above a predetermined value, and when these conditions are satisfied, the control for the valve opening is effected. By doing so, the operation can be carried out more positively, and the overall system can be operated in a coordinated manner.

Next, further embodiments of the invention will be described with reference to FIGS. 11 to 15.

Figure 11:
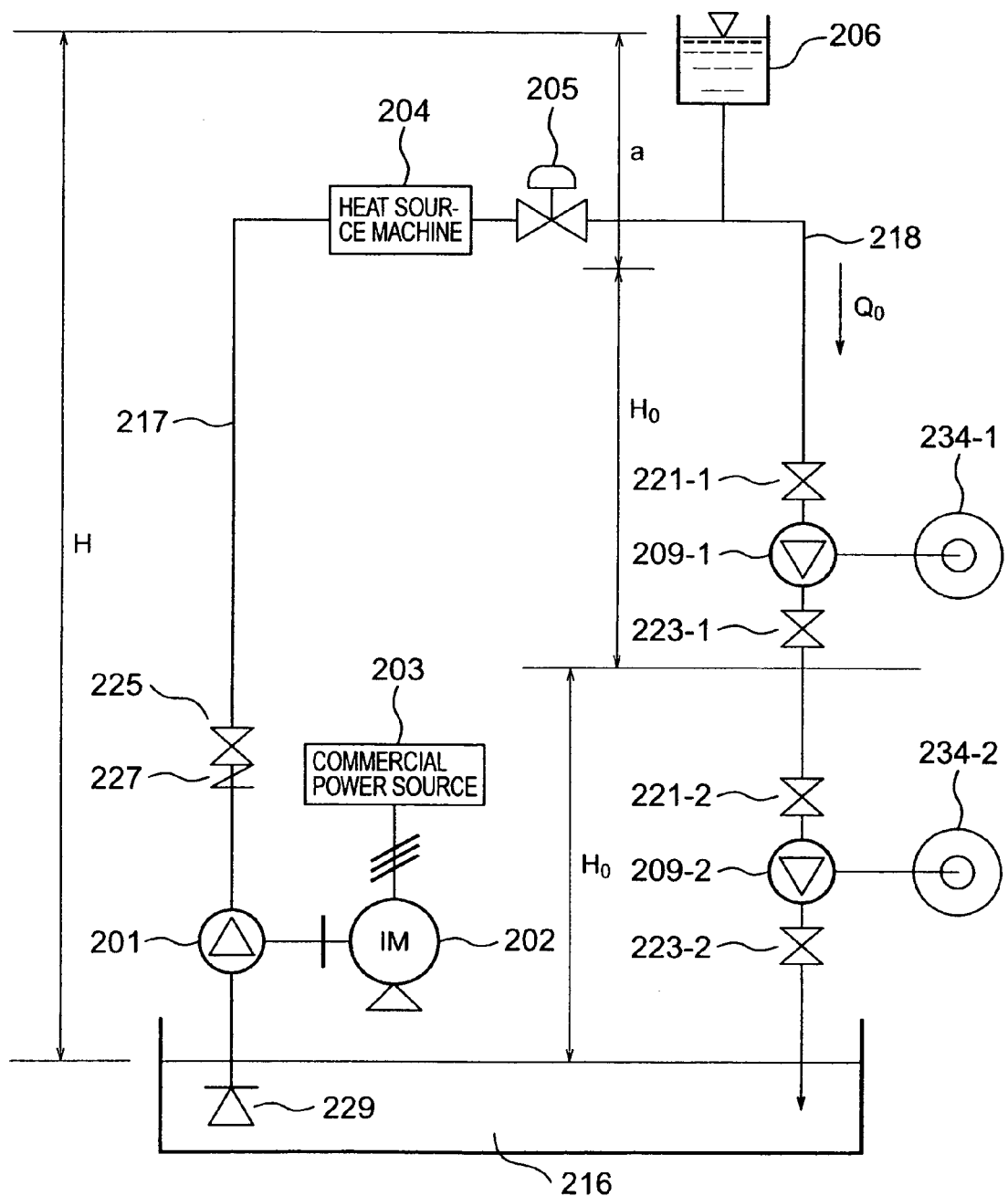
FIG. 11 is a view showing an eighth embodiment of the invention.
Figure 12:
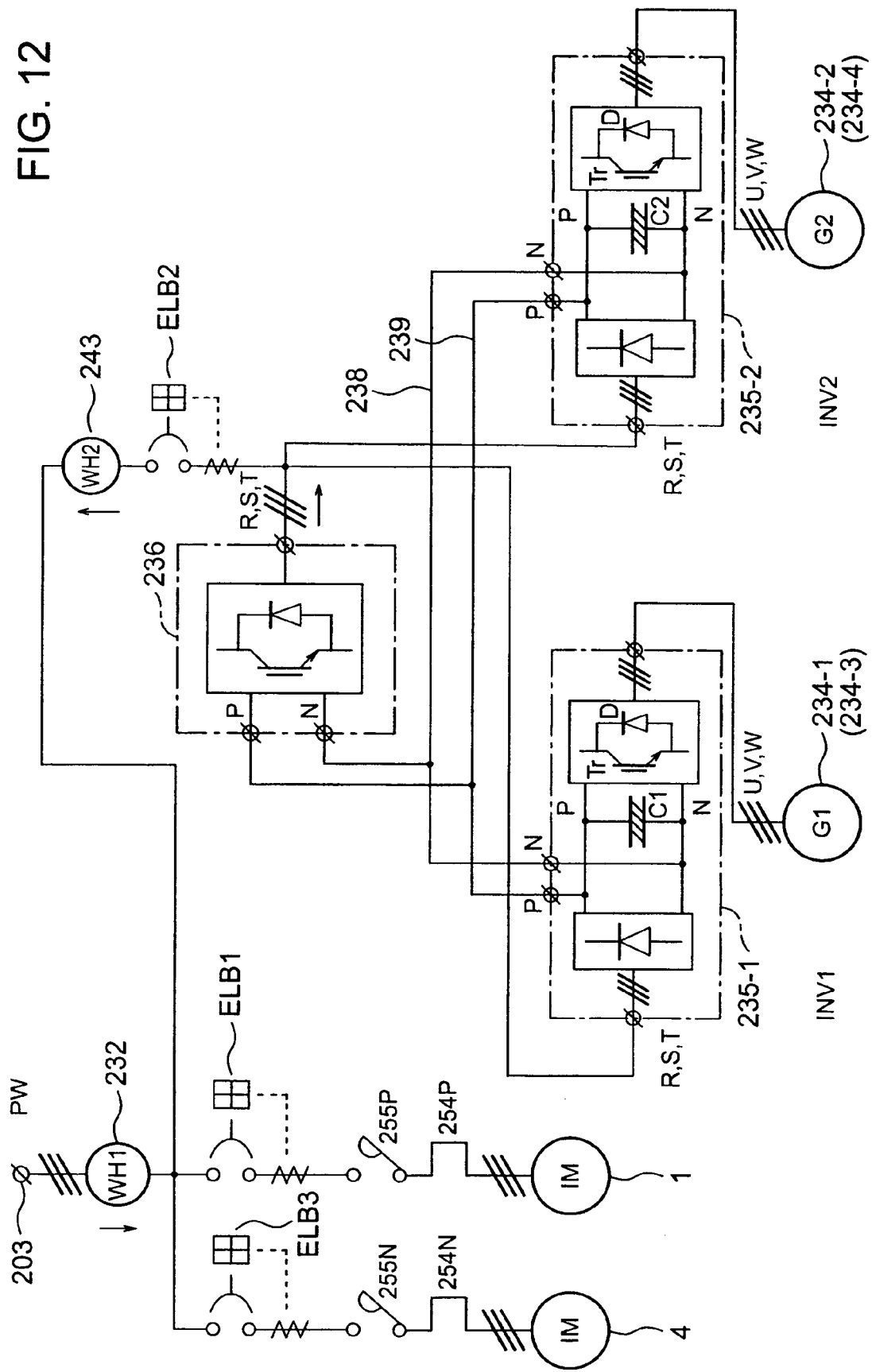
FIG. 12 is a circuit diagram explanatory of the control apparatus related to the schematic diagram of the eighth embodiment.

FIG. 11 is a schematic diagram of an eighth embodiment (serial operation) of the invention. This Figure indicates how many hydraulic turbine power-generating apparatuses should be serially installed and how these apparatuses should be arranged. In this embodiment, there is used an ordinary electric motor 202 (non-double-shaft electric motor) which corresponds to the double-shaft electric motor of FIG. 16 in the regenerative heat air-conditioning system of the reference example having the energy recovery system incorporated in its primary system, and a storage pump and hydraulic turbines are separated from each other. Here, a water quantity of a facility specification is $Q_0$, and a head thereof is H, and the other hand a water quantity of a hydraulic turbine specification is $Q_0$, and an effective head thereof is $H_0$. Namely, when the head H of the facility is divided by the effective head $H_0$, n=2 (the remainder: a) is obtained. This is shown in FIG. 11. As will be hereinafter more fully described in FIG. 13, a hydraulic turbine effective head a (the remainder a) is not enough to cause a generator to generate a required amount of electric energy, and therefore the number of hydraulic turbines to be installed is two, and the two hydraulic turbines are serially connected. Generators 234-1 and 234-2 are mounted respectively on these hydraulic turbines 209-1 and 209-2 (each of which may be of the integral type containing such generator), and inverters 235-1 (INV1) and 235-2 (INV2) are connected respectively to output terminals of the generators 234-1 and 2342 as shown in FIG. 12 which will be described later. Terminals P and N (DC output terminals) of a DC intermediate circuit of these inverters are connected respectively to terminals P and N of a DC circuit portion of a system connecting device (regenerating converter) 236 which is a higher-level device than these inverters, and is provided between a commercial power source 203 (PW) and these inverters. Here, P and N mean DC voltage, and a positive DC voltage is P, and a negative DC voltage is N. Electric power, produced by the generator 234-1, 234-2, flows, as regenerating current, via a flywheel diode D of the inverter 235-1, 235-2, and is stored in a capacitor C (For example, if the generated voltage of the generator is AC 200V, the inverter P-N voltage (DC voltage) is 280V.). When the amount of water, flowing into the hydraulic turbine 209-1, 209-2 varies, so that the amount of electric power, generated by the generator 234-1, 234-2, changes, for example, the above P-N voltage is detected, and each time this voltage goes below 280V, the inverter frequency is lowered by a PWM processing (although not shown in the drawings), and by doing so the regeneration is damped, so that the P-N voltage increases.

Further, the DC voltage terminals N of the inverters 235-1 and 235-2 and the terminal N of the system connecting device (regenerating converter) 236 are connected together by a cable 238, while the DC voltage terminals P of these inverter and the terminal P of the system connecting device 236 are connected together by a cable 239 (see FIG. 12). By doing so, the generated electric power is fed as DC power to the system connecting device (the terminals P and N of the regenerating converter 236), and then is fed back to the commercial power source 203.

FIG. 12 is a circuit diagram explanatory of the control apparatus related to the schematic diagram of FIG. 11. Similar reference numerals to those of FIG. 16 denote identical equipments or devices, and therefore explanation thereof will be omitted. In this Figure, reference numeral 203 (PW) denotes the commercial source, reference numeral 232(WH1) an electric energy meter for measuring the amount of electric power to be purchased from an electric power company, and reference numeral 243 (WH2) an electric energy meter for measuring the amount of electric power to be sold to the electric power company. Reference characters ELB1 to ELB3 denote leakage breakers, respectively. Reference numeral 255N denotes an electromagnetic switch for a heat source machine, reference numeral 255P an electromagnetic switch for the storage pump, reference numeral 254N a thermal relay for the heat source machine, reference numeral 254P a thermal relay for the storage pump, and reference numeral 236 the system connecting device (regenerating converter) which is used for converting the regenerating energy, produced at the load side, into AC electric power (which is acceptable by the power source) and for feeding it back to the power source. Reference numeral 235-1 (INV1) denotes the No. 1 generator-side inverter, reference numeral 235-2 (INV2) the No. 2 generator-side inverter, reference numeral 234-1 (G1) the No. 1 generator, and reference numeral 234-2 (G2) the No. 2 generator. The load-side terminals P and N of the system connecting device 236 are disposed at a higher lever than the No. 1 and No. 2 generator-side inverters 235-1 and 235-2, and the load-side terminal P is connected to the DC voltage terminals P of these inverters while the load-side terminal N is connected to the DC voltage terminals N of these inverters. Namely, electric powers, generated respectively by the No. 1 and No. 2 generators, are converted into DC power by the respective inverters, and the system connecting device 236 coverts this DC power into AC power (acceptable by the power source), and feeds it back to the commercial source 203.

At first, since the hydraulic turbines 209-1 and 209-2 and the generators 234-1 and 234-2 are not operated, electric power is not supplied from the DC voltage terminals P and N of the inverters 235-1 and 235-2, and the water lift pump 201, the electric motor 202 and a group of loads, including a heat source machine 204, are operated only by electric power supplied from the commercial source 203. When the storage pump 201 is operated, water is fed to the heat source machine 204, and when the used water is returned to the hydraulic turbines 209-1 and 209-2, the hydraulic turbines 209-1 and 209-2 and the generators 234-1 and 234-2 are operated, and DC power is supplied from each of the inverters 235-1 and 235-2 to the DC voltage terminals P and N of the system connecting device 236 via the cable 238, 239. The system connecting device 236 converts the DC power into the predetermined AC power, and feeds it back to the commercial source 203. Then, the electric energy meter 243 (WH2) measures the amount of the electric power to be fed back to the power source.

Figure 13:
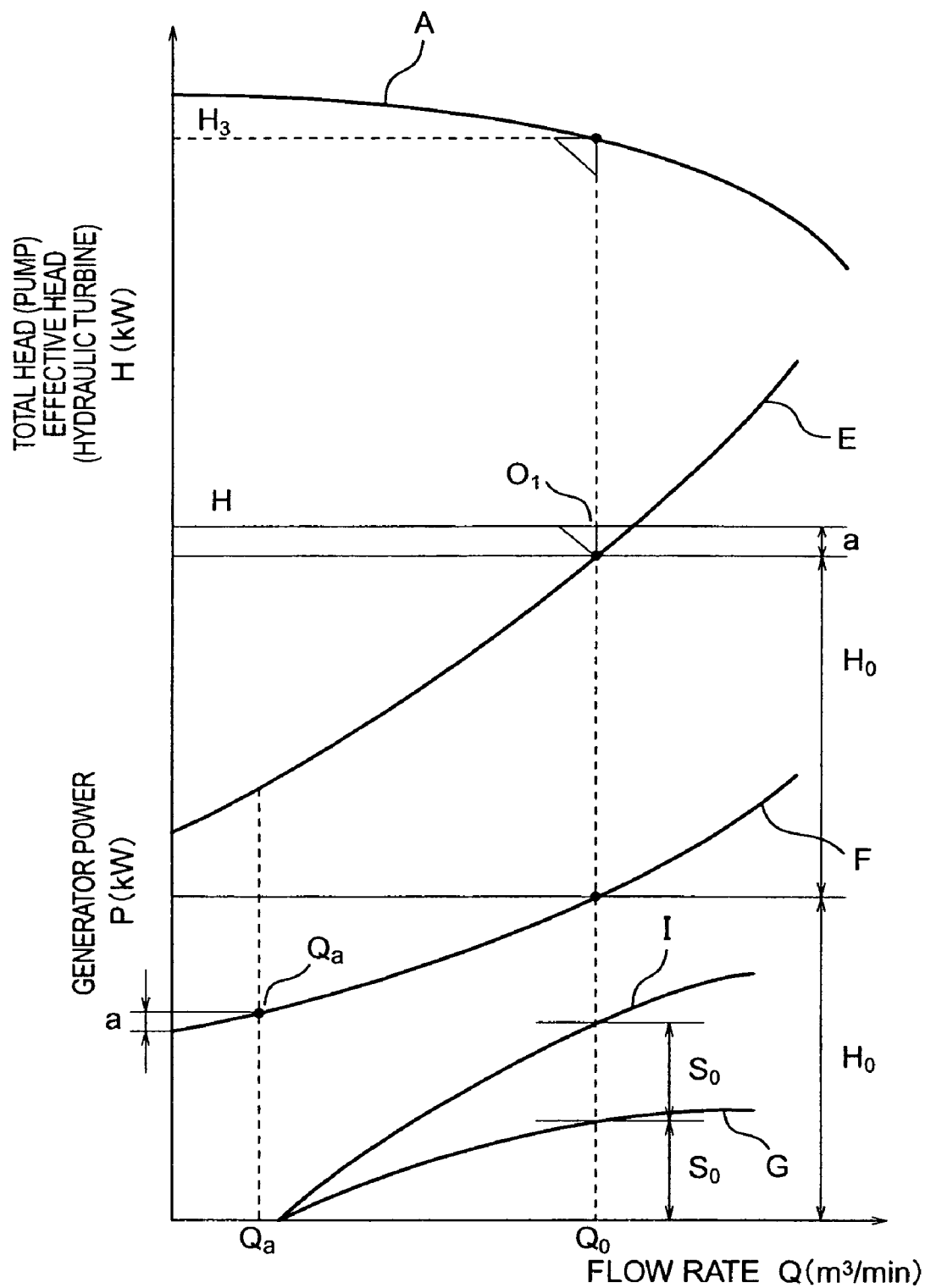
FIG. 13 is a diagram showing operation characteristics of the eighth embodiment of the invention.

FIG. 13 is a diagram showing operation characteristics of the water lift pump and hydraulic turbines of the eighth embodiment of the invention. Identical reference characters to those of FIG. 17 have identical meanings, and therefore explanation thereof is omitted. In FIG. 13, the water lift pump is operated with the water quantity $Q_0$ and the total pump head $H_3$. With respect to the specification of the hydraulic turbine, the water quantity is $Q_0$, and the effective head is $H_0$, and a curve F represents this characteristics. Namely, when the water quantity $Q_0$ and the effective head $H_0$ are provided for the hydraulic turbine, the hydraulic turbine produces power $S_0$. This characteristics are represented by a curve G. When two hydraulic turbines, connected serially, are operated, the effective head is $2H_0$, and a curve E represents this characteristics. When the two hydraulic turbines, serially connected, are operated, the produced power is $2 S_0$, and a curve I represents this characteristics. In this case, the remainder a of the head H of the facility develops as shown in the drawings. When this is indicated on the curve F representing the effective head characteristics obtained at the time of operation of one hydraulic turbine, this is a point Oa representing the water quantity Qa. At this point, the water quantity is so small that the hydraulic turbine will not produce power. This indicates that the number of hydraulic turbines to be installed should be two as shown in this embodiment.

Figure 14:
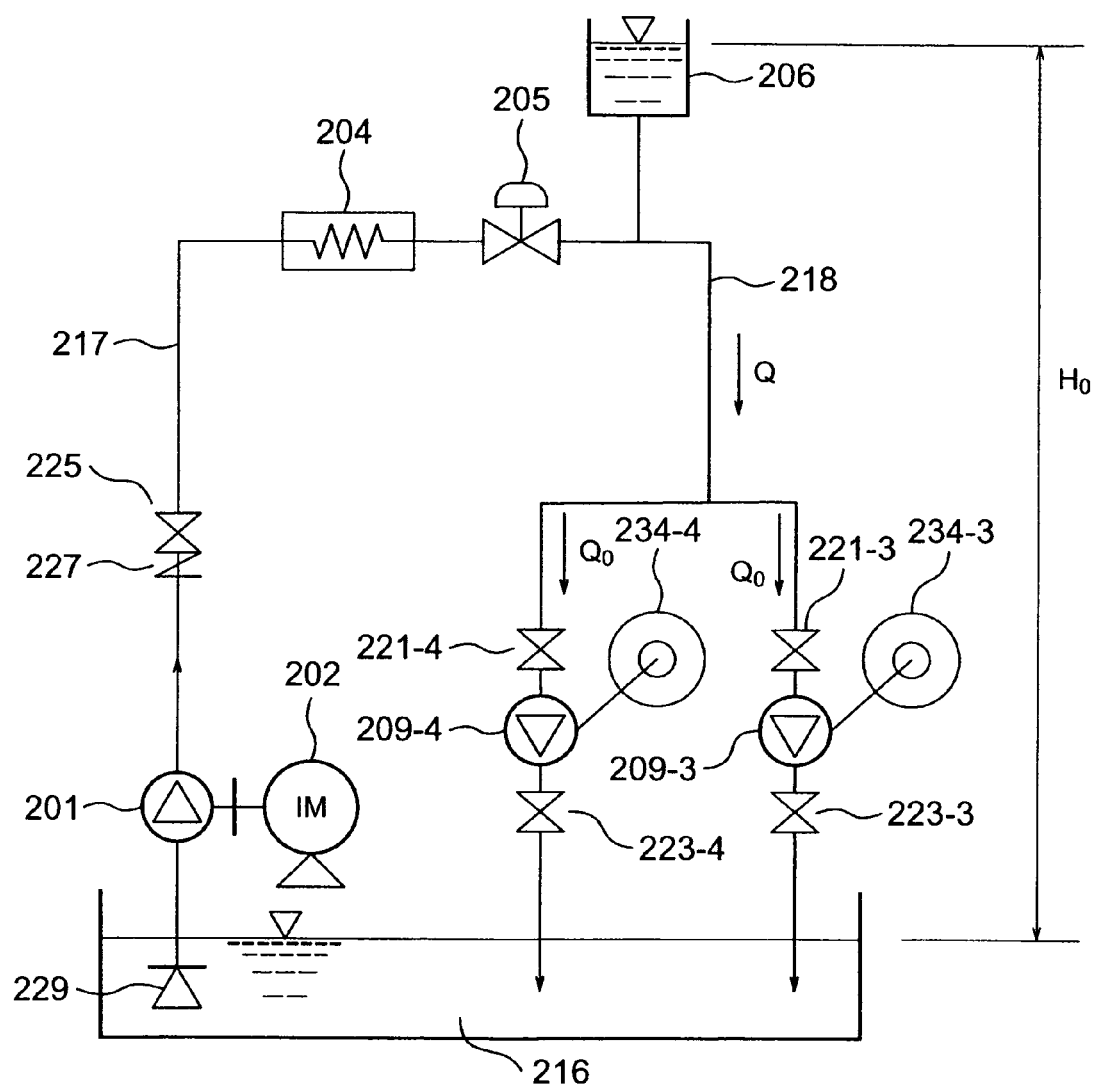
FIG. 14 is a view showing a ninth embodiment of the invention.
Figure 15:
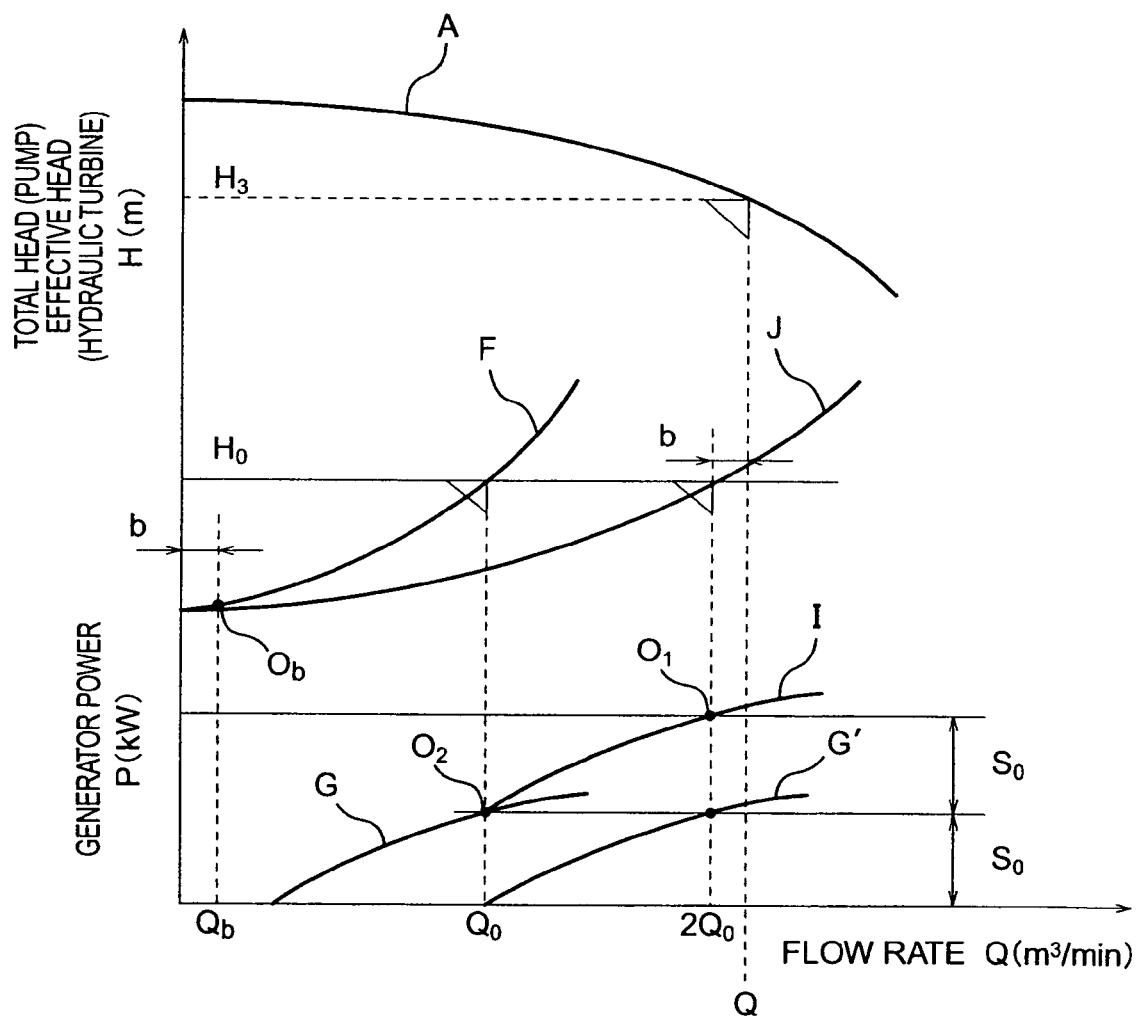
FIG. 15 is a diagram showing operation characteristics of the ninth embodiment of the invention.

FIG. 14 is a schematic diagram of a ninth embodiment (parallel operation) of the invention. This Figure indicates how many hydraulic turbine power-generating apparatuses should be installed in parallel and how these apparatuses should be arranged. In this embodiment, there is used an ordinary electric motor 202 (non-double-shaft electric motor) which corresponds to the double-shaft electric motor of FIG. 16 in the regenerative heat air-conditioning system of the reference example having the energy recovery system incorporated in its primary system, and a water lift pump and hydraulic turbines are separated from each other. Here, a water quantity of a facility specification is Q, and a head thereof is $H_0$, and the other hand a water quantity of a hydraulic turbine specification is $Q_0$, and an effective head thereof is $H_0$. Namely, when the water quantity Q of the facility is divided by the water quantity $Q_0$ of the hydraulic turbine specification, n=2 (the remainder: b) is obtained. This is shown in FIG. 15. As will be hereinafter more fully described in FIG. 15, a water quantity b (the remainder b) of the hydraulic turbine specification is not enough to cause a generator to generate electric power, and therefore the number of hydraulic turbines to be installed is two, and the two hydraulic turbines are connected in parallel.

FIG. 15 is a diagram showing operation characteristics of the storage pump and hydraulic turbines of the ninth embodiment of the invention. Identical reference characters to those of FIG. 17 have identical meanings, and therefore explanation thereof is omitted. In FIG. 15, the water lift pump is operated with the water quantity $Q_0$ and the total pump head $H_3$. With respect to the specification of the hydraulic turbine, the water quantity is $Q_0$, and the effective head is $H_0$, and a curve F represents this characteristics (Q-H). A curve J represents the combined characteristics obtained when the two hydraulic turbines, connected in parallel, are operated. Namely, when the water quantity $Q_0$ and the effective head $H_0$ are provided for the hydraulic turbine, the hydraulic turbine produces power $S_0$. This characteristics are represented by a curve G. When two hydraulic turbines, connected in parallel, are operated, the water quantity is $2Q_0$, and the effective head is $H_0$. This characteristics are represented by a curve G' with a starting point $Q_0$, which is obtained by parallel translation of the curve G. When the curves G and G' are combined together, there is obtained a curve I with a starting point $O_1$, which represents the combined characteristics. This indicates that power, produced when the two hydraulic turbines are operated in parallel, is $2S_0$ at a point $O_1$. In this case, the remainder b of the water quantity Q of the facility develops as shown in the drawings. When this is indicated on the curve F representing the effective head characteristics obtained at the time of operation of one hydraulic turbine, this is a point Ob representing the water quantity Qb. At this point, the water quantity is so small that the hydraulic turbine will not produce power. This indicates that the number of hydraulic turbines to be installed should be two as shown in this embodiment.

In the above embodiments, the electric power, produced by the plurality of generators, is fed as DC power to the system connecting device, in which the power is converted into AC power, and then is fed back to the power source. Therefore, the amount of consumption of electric power can be reduced, and besides any load can be used, and this system can meet with any loads. Furthermore, whether the plurality of hydraulic turbine power-generating apparatuses are installed serially or in parallel, the common control apparatus can be used without the need for changing it.

The terminals P of the DC circuits of the inverter and system connecting device, as well as the terminals N of these DC circuits, are connected together by the cable, and when these cables are long, a wiring loss increases. The inverter and the system connecting device can be contained collectively in the same control panel. With this arrangement, the improvement can be achieved.

In the above embodiments, although the present invention is applied to the primary system of the regenerative heat air-conditioning system, the invention can be similarly applied to the secondary system.

In the above embodiments of the invention, a plurality of general-purpose standardized hydraulic turbine power-generating apparatuses are beforehand prepared for various facility specifications, and the requirement for any facility specification can be met by installing these apparatuses serially or in parallel. Therefore, the time and labor, required for the design, are saved, and the production cost is low, and the installation period is short.

As described above, in the present invention, the higher recovery efficiency can be achieved as compared with the conventional unutilized-energy-recovering apparatus employing the hydraulic turbine. And besides, the invention can meet the various loads, and therefore for example, unutilized energy in a building can be reused.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of operating an energy recovery apparatus in accordance with the following procedure, said apparatus comprising:
   a heat storage tank;
   a storage pump;
   a water lift pump for feeding water from said heat storage tank to an air-conditioning load;
   a first water feed pipe provided between an outlet port of said storage pump and said air-conditioning load;
   a second water feed pipe for returning water that is discharged from an outlet port of said air-conditioning load to said heat storage tank;
   a hydraulic turbine in fluid communication with said second water feed pipe, said hydraulic turbine comprising inlet valves and outlet valves;
   a hydraulic turbine bypassing valve for bypassing said hydraulic turbine; and
   a generator driven by said hydraulic turbine to produce electric power, said electric power being supplied to an electrical load,
   wherein at a time of starting operation of said apparatus:
   (1) said inlet valves of said hydraulic turbine open, said outlet valves of said hydraulic turbine close, and said hydraulic turbine-bypassing valve closes;
   (2) power is provided to a storage pump-driving electric motor;
   (3) a start signal is provided from said generator to said water lift pump;
   (4) operation of said water pump begins after passage of a predetermined time after receiving an operation answer signal;
   (5) said outlet valves of said hydraulic turbine open after passage of said predetermined time, thereby operating said hydraulic turbine and operating said generator to generate electric power; and
   (6) said electric power is supplied to said electric load,
   wherein at a time of stopping operation of said apparatus:
   (1) said outlet valves of said hydraulic turbine close, said hydraulic turbine is stopped, and said generator is stopped;
   (2) said generated electric power is no longer supplied so that said electric power is no longer supplied to said electric load; and
   (3) a stop signal from said generator is provided to said water lift pump, thereby stopping operation of said water lift pump.

2. A method of operating an energy recovery apparatus according to claim 1, comprising:
   operating said generator; and
   detecting that an inlet pressure at said inlet valves of said hydraulic turbine has attained a predetermined pressure, and in response thereto, fully opening said inlet valves and said outlet valves.

3. A method of operating an energy recovery apparatus in accordance with the following procedure, said energy recovery apparatus comprising:
   a heat storage tank located at a lower portion of a building;
   a water lift pump for feeding water from said heat storage tank to an air-conditioning load;
   a storage pump;
   a first water feed pipe provided between an outlet port of said storage pump and said air-conditioning load;
   a second water feed pipe for returning water discharging from an outlet port of said air-conditioning load to said heat storage tank;
   an expansion tank or a vacuum breaking valve provided on the highest portion of said second water feed pipe;
   a hydraulic turbine connected at a lower portion of said second water feed pipe and positioned such that a potential energy of water discharged from a group of said air-conditioning loads can be recovered; and
   a generator rotationally driven by a torque generated by said hydraulic turbine, thereby generating electric power,
   wherein said electric power is supplied to said water lift pump, to said group of air-conditioning loads, and to an electric load,
   wherein at a time of starting a operation of said apparatus:
   (1) said inlet valves of said hydraulic turbine open, said outlet valves of said hydraulic turbine close, and said hydraulic turbine-bypassing valve closes;
   (2) power is provided to a storage pump-driving electric motor;
   (3) a start signal is provided from said generator to said water lift pump;
   (4) operation of said water pump begins after passage of a predetermined time after receiving an operation answer signal;
   (5) said outlet valves of said hydraulic turbine open after passage of said predetermined time, thereby operating said hydraulic turbine and operating said generator to generate electric power; and
   (6) said electric power is supplied to said electric load,
   wherein at a time of stopping operation of said apparatus:
   (1) said outlet valves of said hydraulic turbine close, said hydraulic turbine is stopped, and said generator is stopped;
   (2) said generated electric power is no longer supplied so that said electric power is no longer supplied to said electric load; and
   (3) a stop signal from said generator is provided to said water lift pump, thereby stopping operation of said water lift pump.

4. A method of operating an energy recovery apparatus according to claim 3, comprising:
   operating said generator; and
   detecting that an inlet pressure at said inlet valves of said hydraulic turbine has attained a predetermined pressure, and in response thereto, fully opening said inlet valves and said outlet valves.

* * * * *